United States Patent
Booth

(10) Patent No.: US 8,398,033 B2
(45) Date of Patent: Mar. 19, 2013

(54) CABLE CLAMP

(75) Inventor: Andrew Booth, North Yorkshire (GB)

(73) Assignee: Ellis Patents Holdings Limited, North Yorkshire (GB)

( * ) Notice: Subject to any disclaimer, the term of this patent is extended or adjusted under 35 U.S.C. 154(b) by 0 days.

(21) Appl. No.: 12/052,614

(22) Filed: Mar. 20, 2008

(65) Prior Publication Data

US 2008/0230657 A1    Sep. 25, 2008

Related U.S. Application Data

(63) Continuation of application No. 12/049,003, filed on Mar. 14, 2008, now abandoned.

(30) Foreign Application Priority Data

Mar. 22, 2007    (GB) .................................... 0705516.3

(51) Int. Cl.
*F16L 3/00* (2006.01)
(52) U.S. Cl. ............... 248/63; 248/65; 248/73; 248/74.1
(58) Field of Classification Search .................... 248/63, 248/64, 49, 58, 65, 73, 74.1, 74.3, 74.4, 229.26, 248/228.7, 230.7, 231, 81, 316.1, 316.5, 248/229.13, 229.23, 228.4, 230.4; 24/16 R; 174/68.1; 138/106, 107
See application file for complete search history.

(56) References Cited

U.S. PATENT DOCUMENTS

| 5,435,507 A | * | 7/1995 | Murphy ....................... 248/74.4 |
| 5,742,982 A | * | 4/1998 | Dodd et al. .................... 24/16 R |
| 6,135,398 A | * | 10/2000 | Quesnel ....................... 248/74.1 |
| 6,892,990 B2 | * | 5/2005 | Pisczak ........................ 248/74.4 |
| 2005/0116129 A1 | * | 6/2005 | Boudreau et al. .......... 248/228.7 |

FOREIGN PATENT DOCUMENTS

| DE | 3824197 | 1/1990 |
| FR | 2880211 | 6/2006 |
| GB | 664445 | 1/1952 |
| GB | 1062689 | 3/1967 |
| GB | 2 405 900 | 3/2005 |
| JP | 05-260635 | 10/1993 |
| JP | 2000-341837 | 12/2000 |
| WO | 01/69117 | 9/2001 |
| WO | 2005/107032 A2 | 11/2005 |

OTHER PUBLICATIONS

Search Report issued for related GB Application 0705516.3 dated Jun. 28, 2007.
Ellis Patents, "Electrical Product Catalogue," available Mar. 22, 2007.
European Search Report in related European Patent Application No. EP 08 25 0959, dated Jul. 8, 2008.

* cited by examiner

*Primary Examiner* — Ramon Ramirez
*Assistant Examiner* — Todd M Epps
(74) *Attorney, Agent, or Firm* — Banner & Witcoff, Ltd.

(57) ABSTRACT

A cable clamp for an electrical cable, comprising a first member and a second member that can cooperatively retain a cable between them; wherein the first member has been formed by extrusion in the general axial direction of a cable as it is to be retained in the clamp, at least a portion of the axial cross-section of the first member comprising a receiving part having a curved shape within which a portion of the cable is to be located, and a flange extending from either side of the receiving part; and the second member is attachable at either end to a flange of the first member so as to retain the cable within the receiving part of the first member.

20 Claims, 12 Drawing Sheets

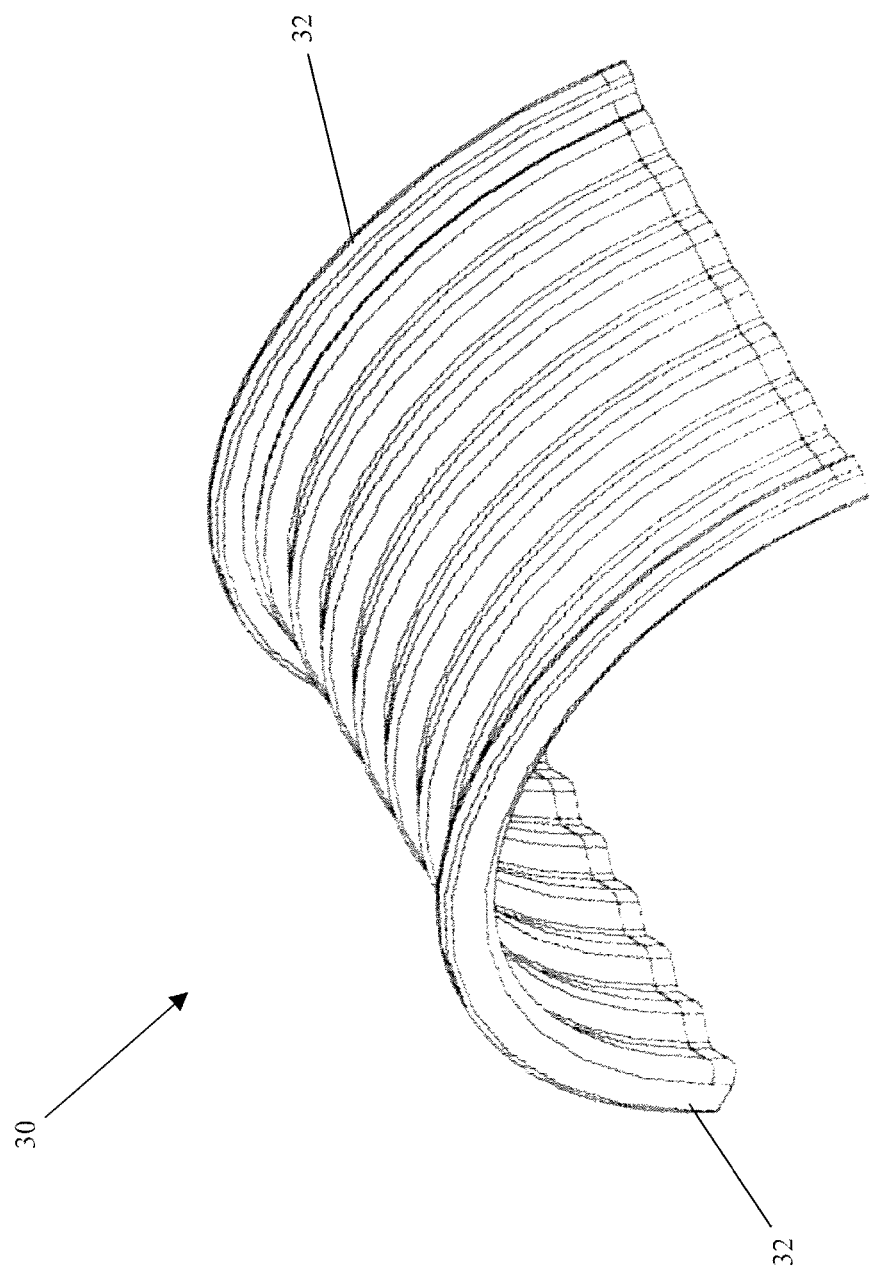

CABLE CLAMP

CROSS-REFERENCE TO RELATED APPLICATION

This application claims priority to prior U.S. patent application Ser. No. 12/049,003, filed Mar. 14, 2008, and GB Application No. 0705516.3, filed Mar. 22, 2007, which are incorporated herein by reference in their entirety.

FIELD OF THE INVENTION

Embodiments of the present invention relate to a cable clamp, otherwise known in the art as a cleat, for cables, such as for example, electrical cables.

BACKGROUND

Electricity may be distributed in three phases; this requires a separate cable for each phase. Some electricity cables carry up to 400,000 volts and are about 150 mm in diameter. The current and voltage in each cable (or phase) varies sinusoidally with respect to time and the cycles of the three phases are offset from each other by a third of a cycle. Due to the varying current in each cable, each cable has a varying magnetic field around it. Since in normal operation the current cycles in the three cables are offset from each other, the resultant magnetic field produced by the three cables is zero.

However, if there is a failure and a short-circuit between the cables occurs, the current cycles in the three cables synchronise. Since the current cycles are in phase with each other, the magnetic fields produced by the three cables no longer cancel each other out and hence there is a magnetic force between them. This force, which can be as great as 7 tonnes, causes the cables to repel away from each other. If the cables are tied down with a fixing of an insufficient strength, for example, then in the event of a short circuit the cables can break away from the fixing, causing significant damage to the surroundings. It is therefore known to use a cable clamp, otherwise known in the art as a cleat, to secure three phase cables.

One type of cable clamp that is suitable for securing a single cable comprises a lower aluminium cast part having a semi-circular recess, and an upper aluminium cast part, also having a semi-circular recess. The semi-circular recesses may be both approximately the same diameter as that of the cable the clamp is intended for. The upper and lower parts of the clamp are held together by a nut and bolt at either side.

During installation of such a clamp, the lower part is bolted to a support in such a way that a portion of the bolts protrudes upwardly above the surface of the lower part. A portion of cable is then located within the semi-circular recess of the lower part and the upper part of the clamp is placed on top of the cable in such a way that the cable is located within the semi-circular recess of the upper portion. The upwardly protruding portions of the bolts are then used to secure the upper clamp part to the lower clamp part; thus securely clamping the cable.

Features of a cable clamp of this design are as follows: Firstly, since the parts are cast in aluminium they are relatively expensive to manufacture and cannot be produced in high volumes particularly quickly. Secondly, since a portion of the attachment bolts protrudes from the surface of the lower part when it has been attached to a support, it is possible to snag the cable on the bolts, thus damaging the cable. Thirdly, the joint between the upper clamp part and the lower clamp part (including the bolts) creates protrusions which may damage the cable. Fourthly, particularly in situations where access is poor, it can be difficult to install such cable clamps due to the type of fixings required.

In urban areas, three-phase power cables may be provided in underground tunnels. Each of the three cables carries up to approximately 400,000V and has an external diameter of between 100-160 mm as mentioned. Each of the three cables is individually supported from the wall of the tunnel at 8 m intervals. Since the cables can weigh in the region of 40 kg/m it is not appropriate to support them using a clamp as described above. Therefore, another type of clamp is used which includes a saddle portion. This type of clamp comprises a support bracket, a cable-supporting saddle, and a cable-clamping member or strap. The bracket is mounted to a support, the saddle sits within the bracket, the cable is located within the saddle, and the member providing the strap is fitted around the bracket, saddle, and cable so as to hold the cable tight within the assembly. The saddle is longer than the strap in the axial direction of the cable and is curved downwards at either end. The cable fits to the curvature of the saddle and sags in between the positions at which it is supported by clamps. This is to allow for the weight of the cable and its expansion and contraction due to thermal variation.

This type of saddle clamp comprises three individual parts that must be manufactured separately and be fitted together in-situ. The saddle clamp can be quite awkward to assemble, especially where space is an issue. Further, due to the manufacturing processes required for the parts, such as casting, the saddle clamp cannot be produced in large volumes quickly. This has an impact on the cost of the saddle clamp.

SUMMARY

Aspects of the invention relate to a cable clamp that may be manufactured quickly and at a low cost when compared to existing clamps. Further aspects of the invention relate to a clamp that may be assembled both simply and quickly when compared to existing clamps.

According to certain embodiments of the present invention there is provided a cable clamp for an electrical cable, comprising a first member and a second member that can cooperatively retain a cable between them; wherein the first member has been formed by extrusion in the general axial direction of a cable as it is to be retained in the clamp, at least a portion of the axial cross-section of the first member comprising a receiving part having a curved shape within which a portion of the cable is to be located, and a flange extending from either side of the receiving part; and the second member is attachable at either end to a flange of the first member so as to retain the cable within the receiving part of the first member.

Optional features of the present invention are set out in the accompanying subsidiary claims.

Further aspects of the invention relate to methods of manufacturing a cable clamp.

Certain embodiments of the present invention may include any combination of the features or limitations referred to herein, and modifications and deviations that are obvious to one skilled in the art given the benefit of this disclosure.

BRIEF DESCRIPTION OF THE DRAWINGS

Embodiments of the present invention will now be described, by way of example only, with reference to the accompanying drawings, in which:

FIG. 10 shows a perspective view of the liner of a cable clamp according to the first embodiment of the invention;

DETAILED DESCRIPTION

Figure 1:
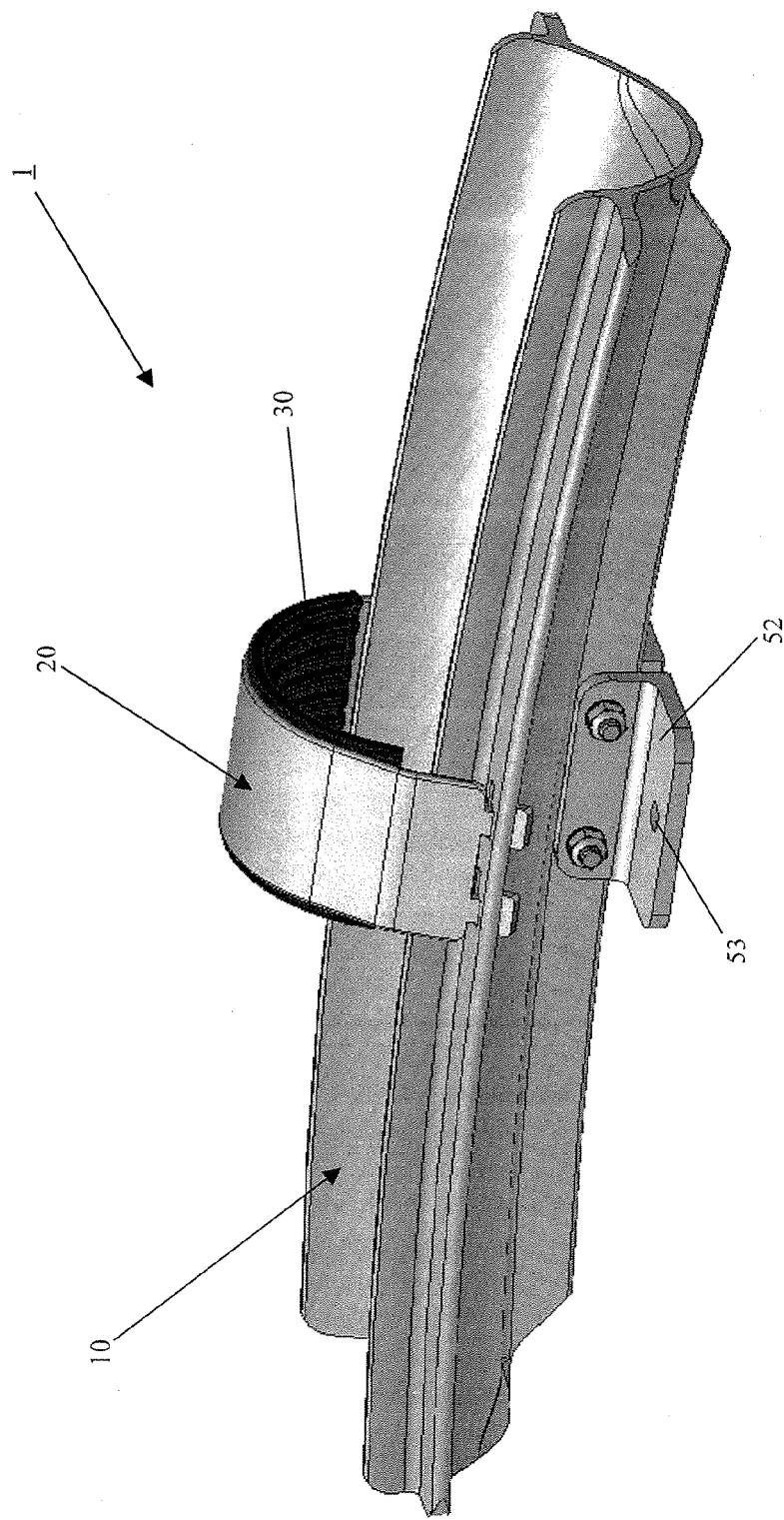
FIG. 1 shows a perspective view of a clamp according to a first embodiment of the invention.

FIG. 1 shows a perspective view of a saddle clamp 1 for an electrical cable according to an embodiment of the invention, comprising a saddle 10 to support a portion of the length of a cable along the length of the saddle, a cable retaining strap 20 and a liner 30 for the strap 20. In the illustrated embodiment, the length of the saddle 10 in the general axial direction of the cable to be retained is substantially longer than the length of the retaining strap 20 in the general axial direction of the cable to be retained.

The saddle 10 and retaining strap 20 may be made from durable materials. In one embodiment, the saddle 10 and/or retaining strap comprise aluminium and/or aluminium alloy. The liner 30 may be made from a corrugated material. The liner may comprise rubber, plastic, or any combination thereof, for example. The saddle 10 and/or the strap 20 may be manufactured by extrusion as will be described, and the liner 30 may be manufactured by injection moulding. The saddle 10 may have an axial cross-section that is substantially constant along its length. The saddle 10 is also slightly curved along its length in a vertical plane that is parallel to the general axial direction of the cable to be retained.

Figure 2:
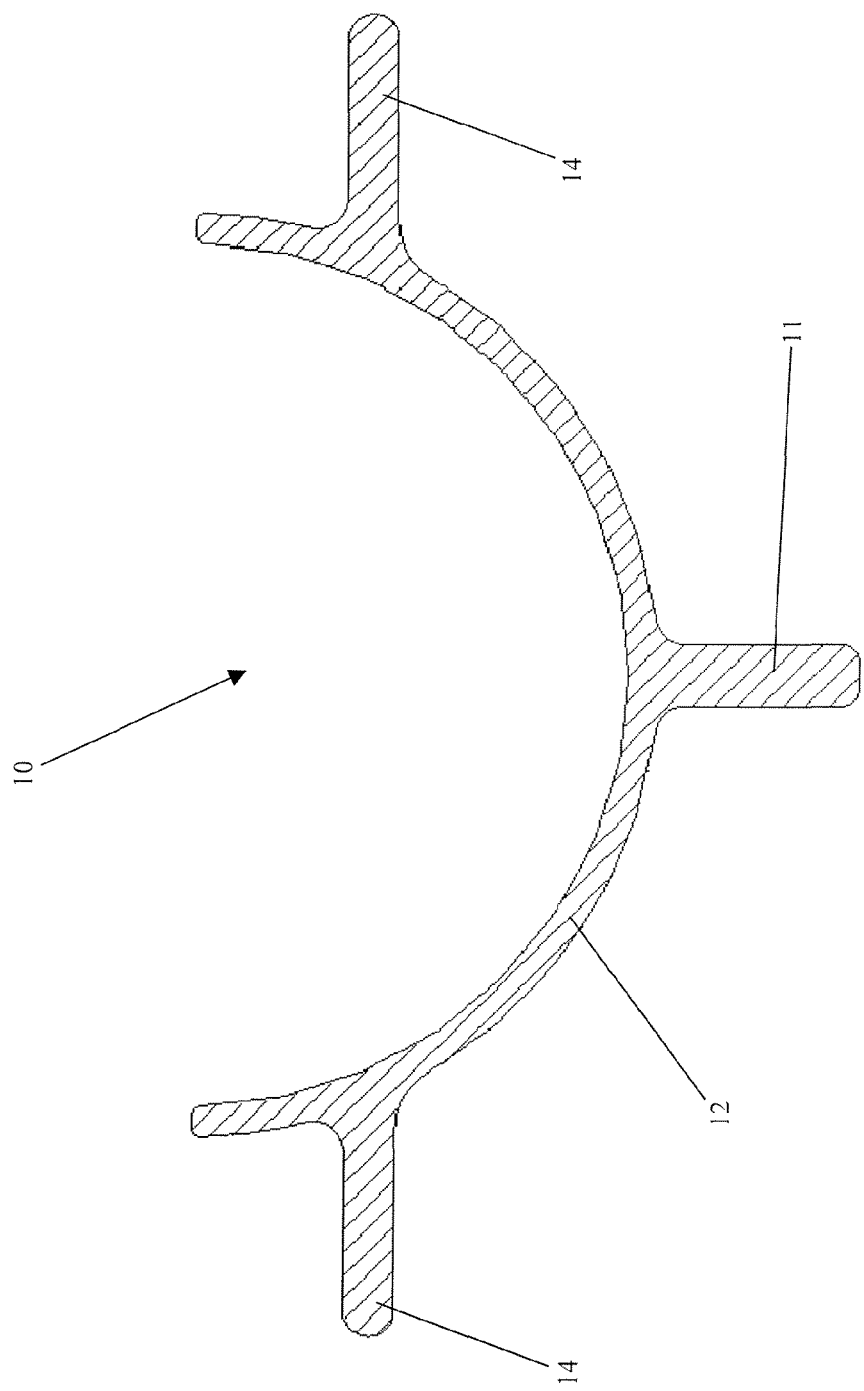
FIG. 2 shows an axial cross-sectional view of a saddle of a cable clamp according to the first embodiment of the invention.

Referring to FIG. 2, the axial cross-section of saddle 10 comprises a cable receiving part 12, a rib 11 and two flanges 14. In the illustrated embodiment, the receiving part 12 is semi-circular and may be sized approximately the same diameter as the outer diameter of the cable to be retained. Rib 11 extends perpendicularly from about the center of the outermost surface of the receiving part 12. Flange 14 extends from either both sides of the outermost surface of the receiving part 12, from a region offset from the edge of the receiving part 12 and in a direction substantially perpendicular to the rib 11. Removable roller boxes (not shown) for facilitating the mounting of a cable in the receiving part 12 may be mounted on the ends of the flanges 14.

Figure 3:
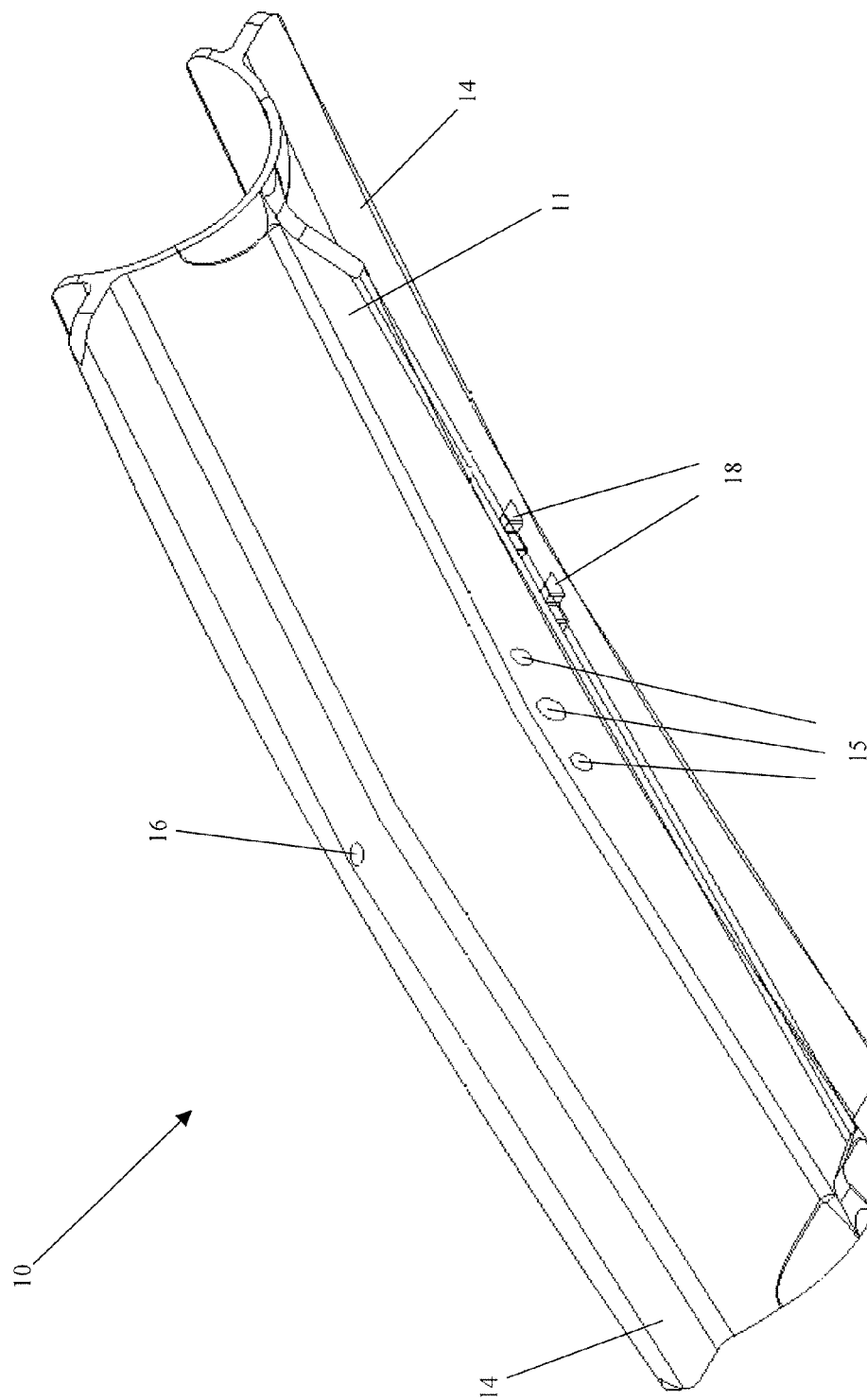
FIG. 3 shows a perspective view from below of the saddle of a cable clamp according to the first embodiment of the invention.
Figure 4:
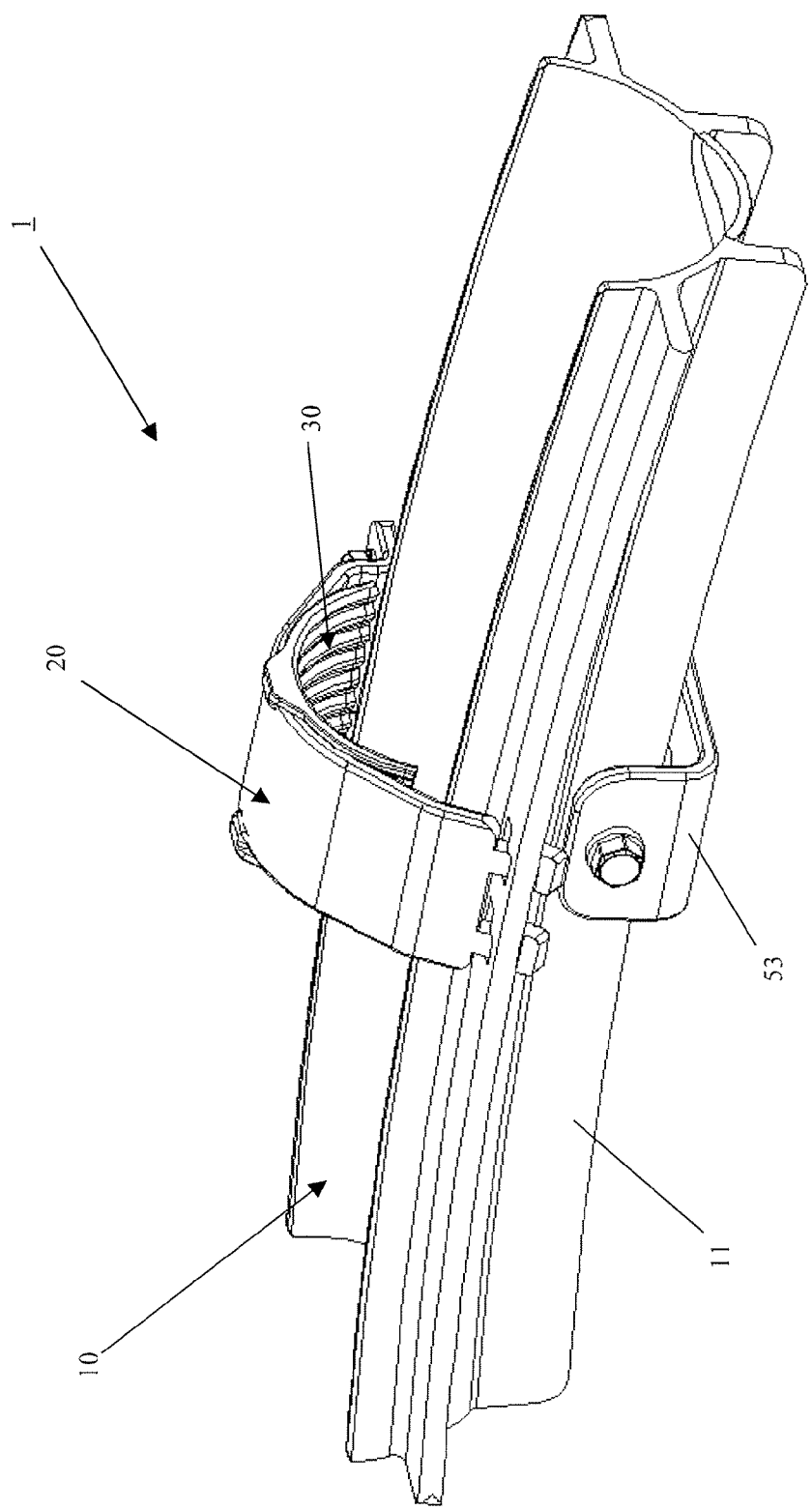
FIG. 4 shows a perspective view of a clamp according to a modification of the first embodiment of the invention.
Figure 5:
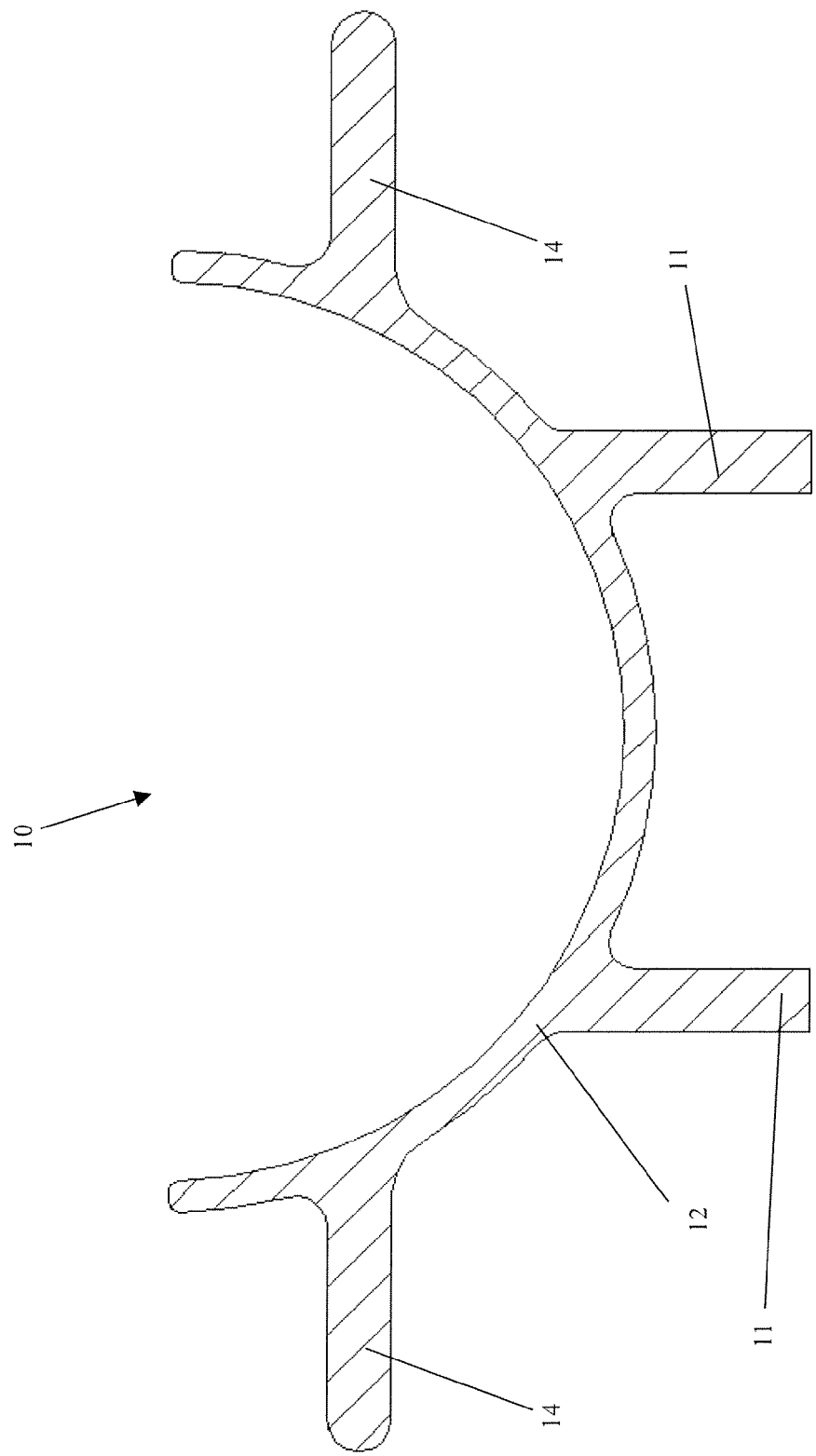
FIG. 5 shows an axial cross-sectional view of a saddle of a cable clamp according to a modification of the first embodiment of the invention.
Figure 6:
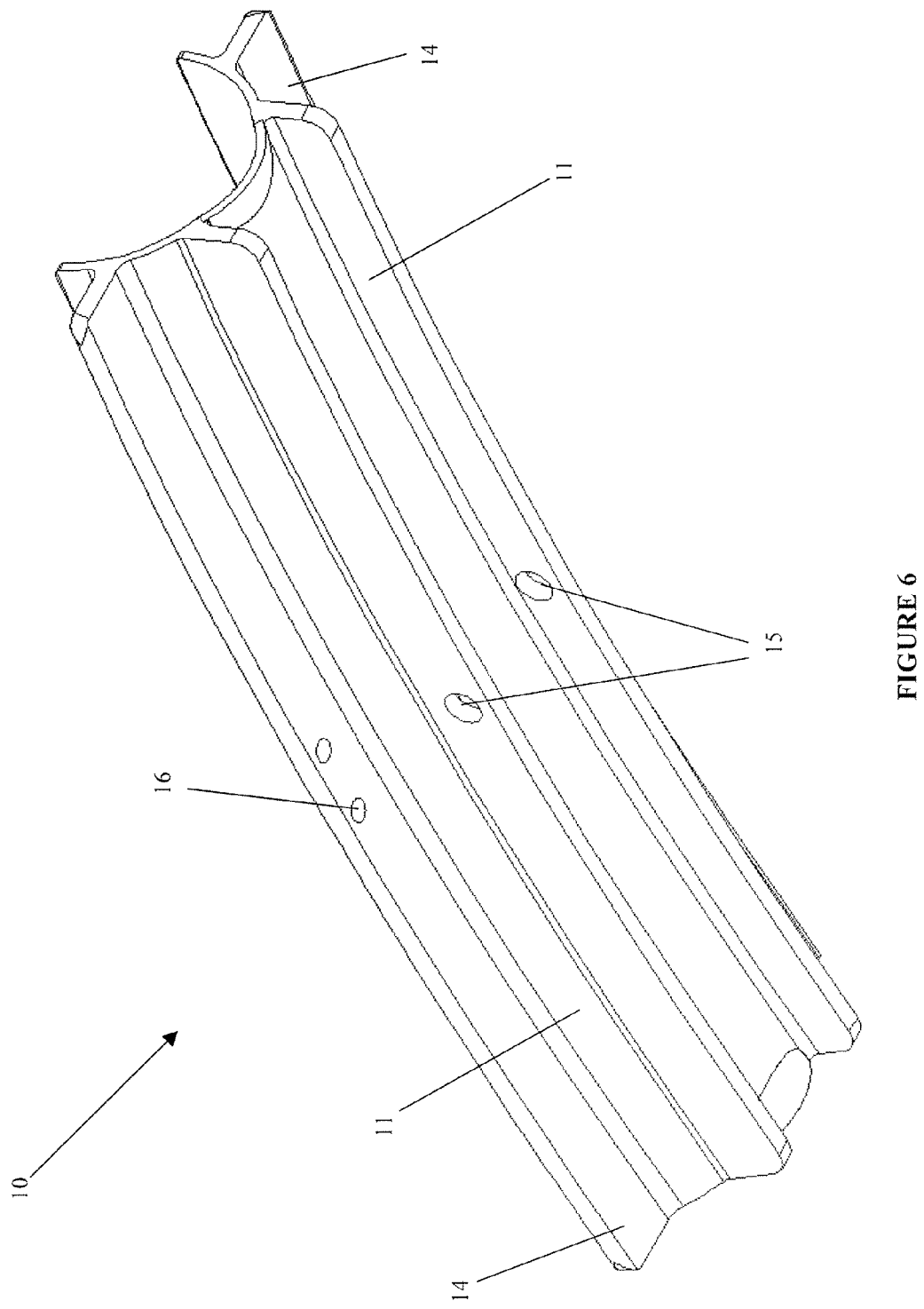
FIG. 6 shows a perspective view from below the saddle of a cable clamp according to a modification of the first embodiment of the invention.

With reference to FIG. 3, one of the flanges 14 has a hole 16 at about the center of its length in a plane that is perpendicular to rib 11. The other flange 14 has two L-slot openings 18, at around the center point of its length, in a plane that is perpendicular to the rib 11. Rib 11 has three holes 15 in it in a plane that is perpendicular to the flanges 14. As shown in the illustrated embodiment, there is a center hole 15 that is located at about the center of the length of rib 11 and there are two slightly smaller holes 15 equally spaced either side. FIGS. 4, 5 and 6 show a saddle 10 according to modification of the first embodiment. As opposed to a single rib 11 that extends from the center of the receiving part, two ribs 11 are provided that extend from each side of the center of the receiving part. This improves both the flexural and torsional strength of the saddle. Each rib may be provided with a hole 15 in a plane that is perpendicular to the flanges. Although the saddle has been described as having either one or two ribs 11, it will be readily apparent to the skilled person that a greater number of ribs may be used. Further, depending on the application of the cable clamp, it is not essential that the saddle has a rib. As will be explained in more detail below, those skilled in the art upon review of this disclosure will readily understand that the placement and/or the quantity of holes and/or L-slot openings will vary depending on the intended usage and/or manufacturing specifications of the clamp. The above description merely describes illustrative embodiments to provide clarity for the reader.

Those skilled in the art will also understand that various embodiments of the clamps disclosed herein may be manufactured by different technologies and processes. The Applicants, however, provide one such manufacturing technique below that the Applicants believe provides satisfactory results. In one exemplary embodiment of manufacturing a saddle, such as saddle 10, aluminium and/or aluminium alloy is forced through a die having the same cross-section as the saddle 10 cross-section described above. This produces a long extruded member having a constant cross-section. This extruded member may then be cut into individual portions, each having a length corresponding to the length of saddle 10 required. The individual saddle portions may then be pressed, or stamped by sandwiching the individual saddle portions between two dies and applying a high load of force or pressure. This curves the saddle 10 along its length so as to produce saddle 10 as shown in FIG. 1. The holes 16 and openings 18 in the flanges may then be cut out. The opposed axial ends of the receiving part 12 of the saddle 10 are also flared downwardly so as to avoid damage to a cable located in the receiving part. The holes 15 in the rib 11 may be cut out separately.

Figure 7:
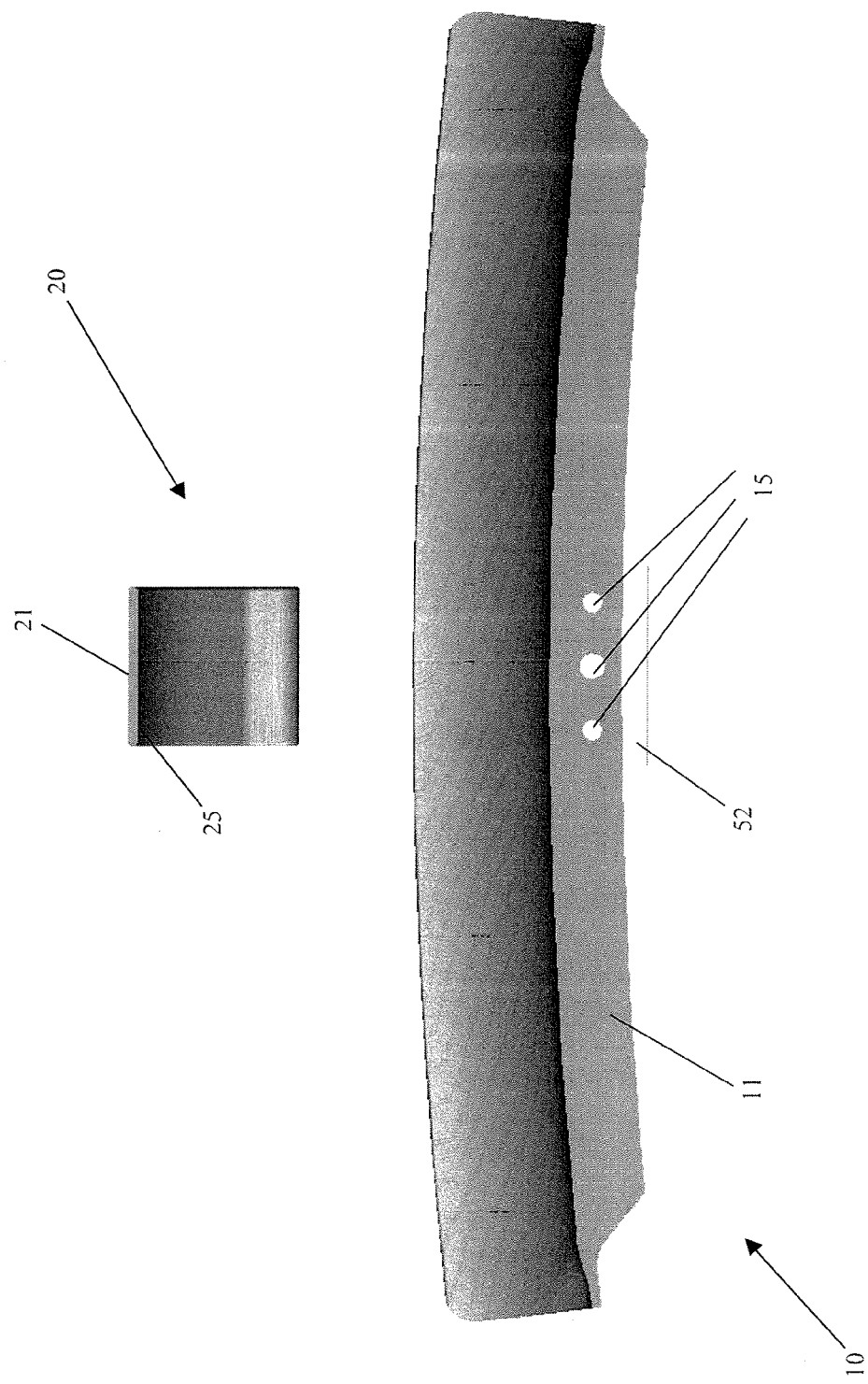
FIG. 7 shows the saddle in profile and a cross-section of a retaining strap of the cable clamp according to the first embodiment of the invention.
Figure 8:
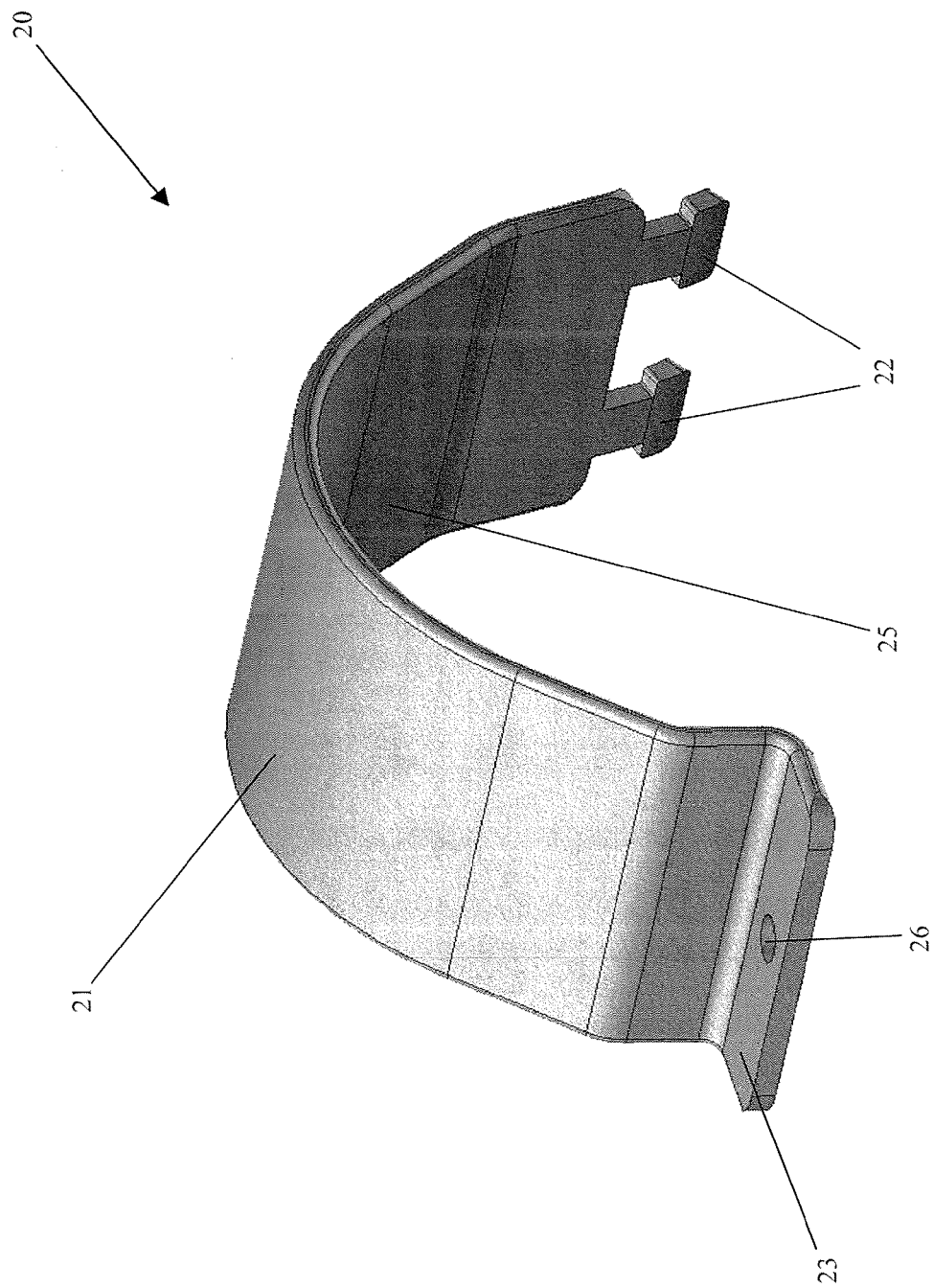
FIG. 8 shows a perspective view of the retaining strap of the cable clamp according to the first embodiment of the invention.

Referring to FIG. 7 and FIG. 8, the retaining strap 20 has a substantially constant cross-section in a direction that is perpendicular to the general axial direction of the cable to be retained. It has a radius of curvature, in a plane perpendicular to the general axial direction of the cable to be retained. In one embodiment, the radius may be slightly larger than the radius of the said cable. The retaining strap 20 may have a T-shaped protrusions 22 at one end and a flange 23 with a hole 26 in it at the other end. The cross-section of the retaining strap 20 may be smooth on both of its upper outer surface 21 and lower inner surface 25. However, the lower inner surface 25 may be ribbed so that the coefficient of friction between the retaining strap 20 and a cable to be retained 40 is increased.

Also shown in FIG. 7 is a saddle, such as saddle 10 in longitudinal section, showing its slight longitudinal curvature and the downward flares at its two ends.

The retaining strap 20 may be manufactured by forcing or aluminium or aluminium alloy through a die having the same cross-section as the strap 20 cross-section described above. This produces a long extruded member having a constant cross-section. This extruded member may then be cut into individual portions, each having a length corresponding to the length of retaining strap 20 required. The individual portions may then be stamped to create the T-shaped protrusions 22 and/or the hole 26. The individual stamped portions may then be forged by sandwiching them between two dies and applying a high load of force or pressure. This gives the retaining strap 20 the required curvature and also creates the flange 23 within which the hole 26 is located.

Figure 9:
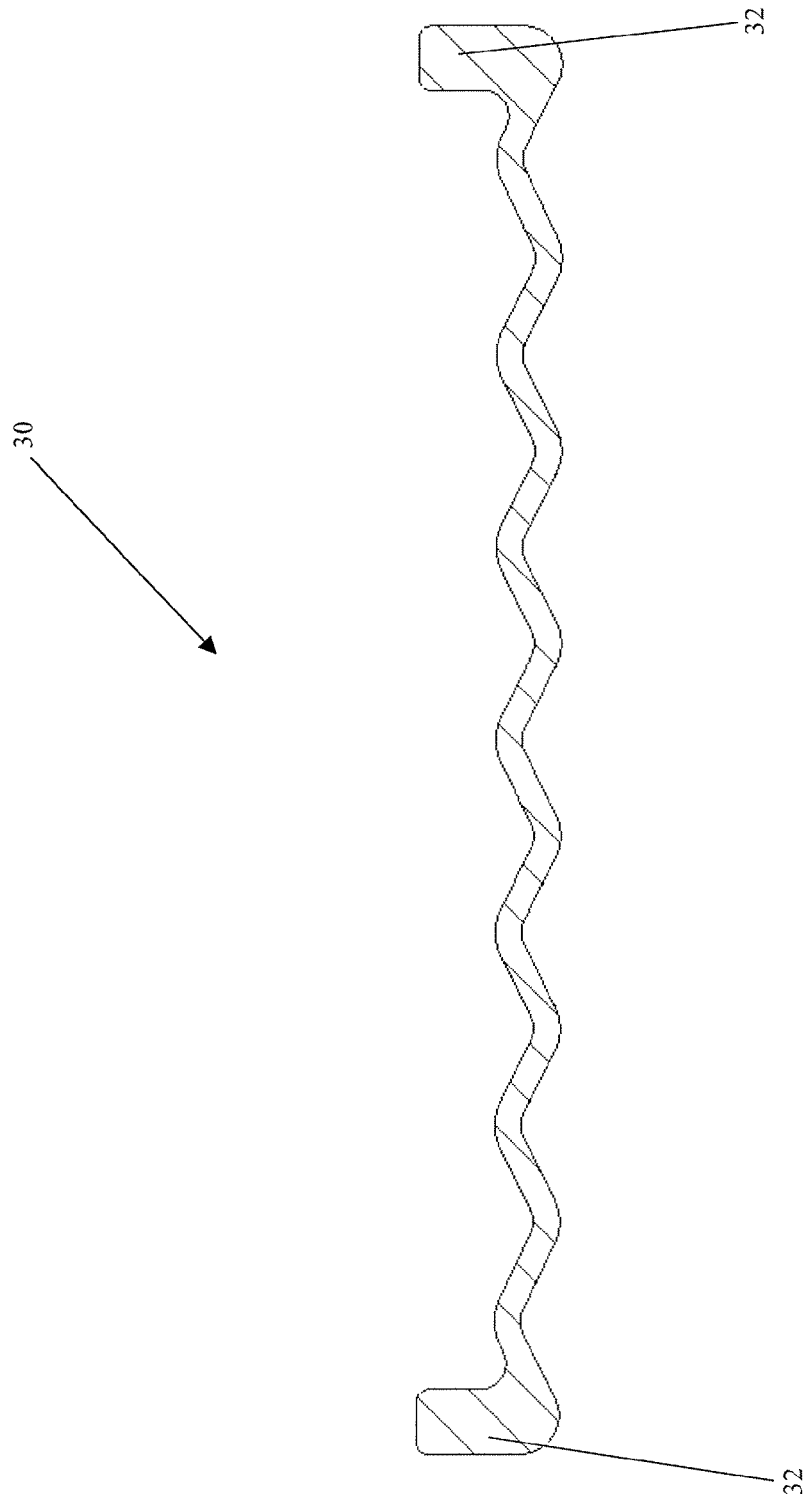
FIG. 9 shows a cross-section of a liner of the cable clamp according to the first embodiment of the invention.
Figure 11A:
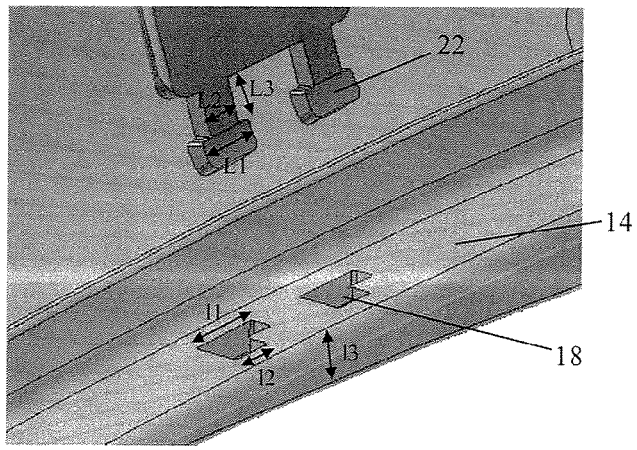
FIG. 11 shows an enlarged view of corresponding T-shaped protrusions and L-shaped openings that may be used in one or more embodiments of the invention.
Figure 11B:
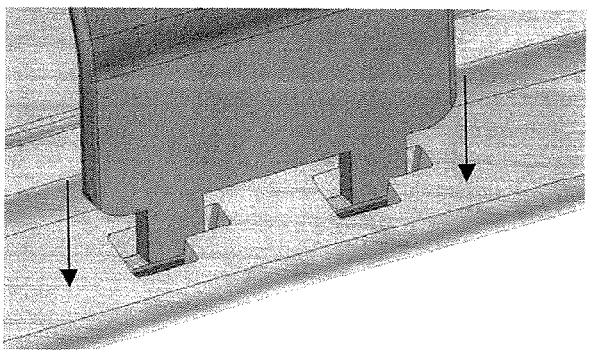
Figure 11C:
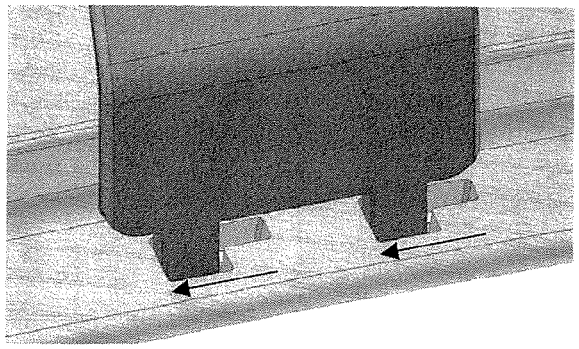
Figure 11D:
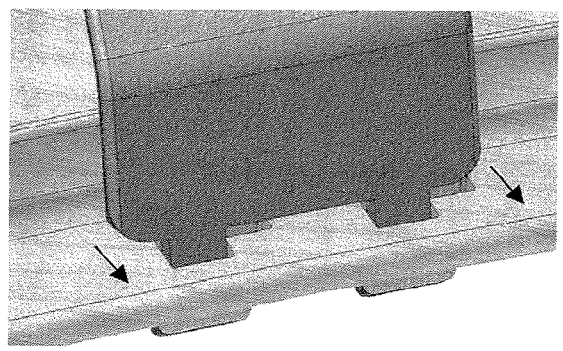

FIG. 9 and FIG. 10 show an exemplary corrugated plastic liner 30. In the illustrative embodiment, the liner 30 is substantially semicircular and has a constant cross-section in the angular direction. The inner diameter of the liner 30 is similar to the outer diameter of the cable to be retained and the outer diameter of the liner 30 is similar to the inner diameter of the curved part of the retaining strap 20. At either end of the cross-section of the liner 30 there is a lip 32 such that when the liner 30 is pressed into the lower inner surface 25 of the retaining strap 20 it is held there without the need for adhesive. The liner 30 may be manufactured simply, quickly and cheaply by injection moulding.

Referring back to FIGS. 1, 3, 4, 6 and 8, one method of assembling the clamp is provided. To assemble the clamp 1, with a cable supported along the saddle 10, the liner 30 is located on the inner lower surface 25 of the retaining strap 20, the T-shaped protrusions 22 on the retaining strap 20 are located in and engaged with the L-shaped openings 18 in the flange 14 of the saddle 10 and a bolt through holes 16 and 26 is used to fasten the flange 14 of the saddle to the flange 23 of the retaining strap 20. The bolt through holes 16 and 26 securely holds the retaining strap 20 to the saddle 20 by preventing the protrusions 22 of the retaining strap 20 from disengaging with the openings 18.

FIG. 11 shows an enlarged view of the T-shaped protrusions 22 of the retaining strap 20 and the L-shaped openings 18 on the flange 14 of the saddle 10 according to one embodiment of the invention. In the illustrated embodiment, there are two protrusions 22 and two openings 18 that are spaced apart by an equal amount. The longest length of the T-shaped protrusions 22 (L1) is slightly smaller than the longest length of the L-shaped openings 18 (l1). The shortest length of the T-shaped protrusions 22 (L2) is slightly smaller than the shortest length of the L-shaped openings 18 (l2). The height of the shortest part of the T-shaped protrusions 22 (L3) is slightly greater that the thickness of the flange 14 (l3). The geometric shape of the protrusions 22 and openings 18 allows the retaining strap 20 and saddle 10 to be interlocked together by moving one, relative to the other, in three directions. First, the protrusions 22 are aligned with the openings 18 (FIG. 11A), they are then fully inserted into the openings 18 (FIG. 11B), the protrusions 22 are then moved to one side (FIG. 11C) and the protrusions are then shifted backwards (FIG. 11D). The bolt through holes 16 and 26 are then used to secure the other end of the retaining strap 20 to the flange 14 of the saddle 10. This creates a particularly secure connection such that even if the clamp 1 vibrates, and the protrusions 22 move within the openings 18, movement must occur in two distinct directions before the protrusions 22 become disengaged with the openings 18.

In one exemplary method of installing a saddle clamp, such as saddle clamp 1, the saddle clamp 1 is installed as follows in order to retain a cable extending in a general axial direction therein. The saddle 10 is first mounted to a support. This may be done by mounting the saddle 10, in a pivoting fashion, using the central hole 15 in the rib 11. Alternatively, one or two L-shaped brackets 52 may be fixed to the saddle 10 using the holes 15 in the rib 11, and the holes 53 in the bracket 52 may be used to mount the saddle to a support. With reference to FIG. 4, a U-shaped bracket 52 may be used to mount the saddle 10 to a support. A portion of cable is then located within the receiving part 12 of the saddle 10. A portion of cable may then be located within the receiving part 12 of the saddle 10. The liner 30 is fixed to the inner lower surface 25 of the retaining member 20. The T-shaped protrusions 22 are then engaged with the L-shaped openings 18 in the flange 14 of the saddle 10, in the manner described above, and a bolt is used to secure the other end of the retaining member 20 to the other flange 14 of the saddle 10 through holes 16 and 26. The cable is allowed to fit to the slight longitudinal curvature of the saddle 10 and the flared ends of the saddle 10 ensure that there is not a localized force on the cable. In certain embodiments, the cable may be supported approximately every 8 meters and may be allowed to sag in between each support.

Figure 12:
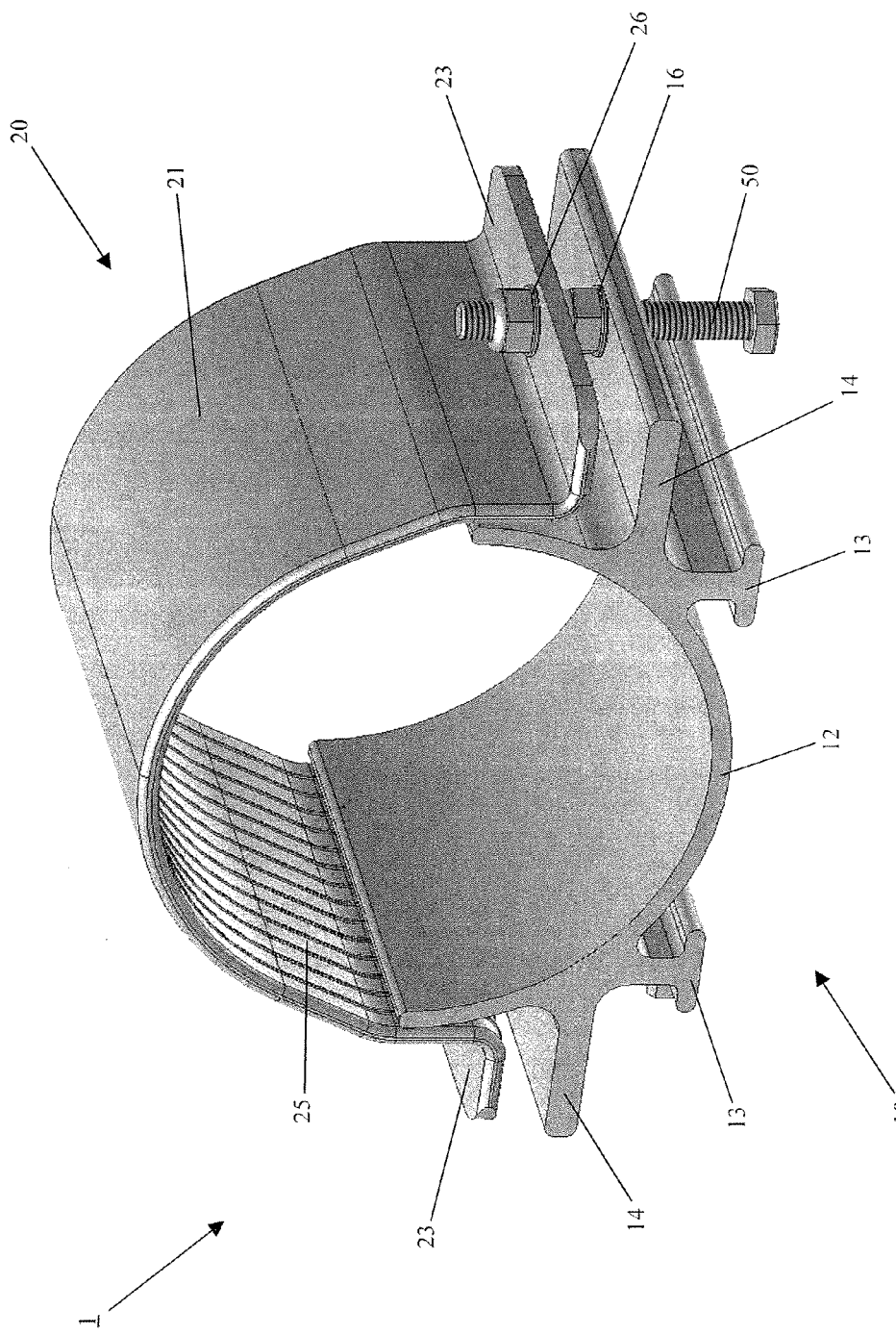
FIG. 12 shows a perspective view of a cable clamp according to a second embodiment of the invention.

FIG. 12 shows a cable clamp, such as cable clamp 1, according to a second embodiment of the invention. As seen in the Figure, the elongate saddle is replaced with a base part 10 that is not curved along its axial length, which is short. Also, instead of a rib 11 it may comprise a plurality of feet, such as for example, the two feet 13 shown in FIG. 12, that extend perpendicular to the flanges 14 and are spaced both sides of the center of the receiving part 12. In another embodiment, the retaining strap does not have protrusions at one end, instead, both ends may have flanges 23 with holes 26. The flange 14 of the base part 10 may not have L-shaped openings, but rather has a hole 16 in it, for example, similar to the hole 16 on the other flange. The length of the base part 10 in the general axial direction of the cable 40 to be retained, is substantially the same as the length of the retaining member or strap 20 in the general axial direction of the cable 40 to be retained. A liner 30 may optionally be provided. The base part 10 and retaining member 20 may both be aluminium or any suitable aluminium alloy, or any other extrudable metal, and are formed similarly to the parts 10, 20 in the first embodiment.

According to one exemplary method of installation, clamp 1 may be installed as follows. Two bolts 50 may be used to bolt the base part 10 to a support. The base part 10 may be bolted through the holes 16 in the flanges 14. The feet 13 ensure that the base part 10 is mounted securely and stably. A portion of the bolts 50 protrude from the surface of the flange 14 but in at least one embodiment, it is particularly important that they to not protrude above the level of the receiving part 14. A portion of cable is then located within the receiving part 12. Since the bolts 50 do not protrude above the receiving part there is no danger of the cable being damaged by the bolts 50 on installation of the cable. Also, the bolts may be electrically shielded from the installed cable as also could be the case if bolts were employed in the first embodiment.

The retaining member 20 (with or without a liner 30) may then be fixed to the base part 10 using the protruding parts of the bolts 50 and the holes 26 in the flanges 23. Thus, the cable is securely retained in the clamp 1. As opposed to bolting both sides of the retaining member 20 to the base part 10, corresponding protrusions 22 and openings 18 may be used, as described for the first embodiment.

The described and illustrated embodiments may be manufactured quickly, easily and relatively cheaply using extrusion as described. They may also be easily assembled, and the flanges and ribs may have a reinforcing effect on the clamp.

In certain known uses, a typical size of cable to be accommodated in a clamp as described and illustrated could be a cable carrying up to 400,000 volts roughly 150 mm in diameter, although as would be appreciated by those skilled in the art, clamps could be designed for other sizes of cable also.

The invention claimed is:
1. A cable clamp for an electrical cable, comprising:
a first member and a second member configured to cooperatively retain a cable between them; wherein the first member has been formed by extrusion in the general axial direction of a cable as it is to be retained in the clamp to produce a constant axial cross-section of the first member, at least a portion of the axial cross-section of the first member comprising a receiving part having a curved shape within which a portion of the cable is to be located, and a flange extending from either side of the receiving part;

the second member is attachable at either end to a flange of the first member so as be configured to retain the cable within the receiving part of the first member, wherein the first member is in the form of a saddle that is curved in a plane that is parallel to the general axial direction of the cable; and wherein the length of the first member is longer in the general axial direction of the cable than the length of the second member in the general axial direction of the cable and wherein the flange extends along the entire length of the first member.

2. The cable clamp according to claim 1, wherein at least one of the first member and the second member comprises aluminium or an aluminium alloy.

3. The cable clamp according to claim 1, wherein a liner is located on a portion of the second member and configured to be in contact with the cable when it is retained.

4. The cable clamp according to claim 3, wherein the liner comprises material selected from the group consisting of: corrugated material, plastic, rubber, and combinations thereof.

5. The cable clamp according to claim 1, wherein the receiving part of the first member is substantially semi-circular.

6. The cable clamp according to claim 1, wherein the flanges extend from regions that are offset, in a direction perpendicular to the general axial direction of the cable, from the edges of the receiving part.

7. The cable clamp according to claim 1, wherein the second member has been formed by extruding and then pressing.

8. The cable clamp according to claim 7, wherein the second member has been formed by extruding in a direction perpendicular to the general axial direction of the cable to be retained.

9. The cable clamp according to claim 1, wherein the ends of the second member have holes which correspond to holes in the flanges of the first member, such that upon alignment, bolts may be used to attach the second member to the first member.

10. The cable clamp according to claim 1, wherein a first end of the second member has at least one protrusion which may be engaged with an opening in a first flange of the first member, and the second end of the second member is attachable to the second flange of the first member, such that a cable may be retained in the receiving part of the first member by engaging the at least one protrusion of the second member with the opening in the first flange of the first member and attaching the second end of the second member to the second flange of the first member.

11. The cable clamp according to claim 10, wherein the second end of the second member has a hole which corresponds to a hole in the second flange of the first member, such that upon alignment a bolt may be used to attach the second end of the second member to the second flange of the first member.

12. The cable clamp according to claim 10, wherein at least one protrusion is T-shaped and at least one opening is L-shaped.

13. The cable clamp according to claim 1, wherein the receiving part has a concave side configured to receive the portion of the cable therein and a convex side opposite the concave side, and wherein at least a portion of the cross-section of the first member further comprises at least one axially elongated rib extending from the convex side of the receiving part.

14. The cable clamp according to claim 1, wherein at least a portion of the cross section of the first member further comprises a foot.

15. The cable clamp according to claim 14, wherein the receiving part has a concave side configured to receive the portion of the cable therein and a convex side opposite the concave side, and wherein at least a portion of the first member comprises two axially elongated ribs extending from the convex side of the receiving part.

16. The cable clamp according to claim 15, wherein at least a portion of the cross-section of the first member comprises two feet.

17. The cable clamp according to claim 1, further including means for attaching the cable clamp to a supporting member.

18. The cable clamp according to claim 1, wherein the ends of the first member are flared.

19. A cable clamp for an electrical cable, comprising:
a first member and a second member configured to cooperatively retain a cable between them; wherein
the first member has been formed by extrusion in the general axial direction of a cable as it is to be retained in the clamp, at least a portion of the axial cross-section of the first member comprising a receiving part having a curved shape within which a portion of the cable is to be located, and a pair of flanges extending from opposing sides of the receiving part and extending in the axial direction along the opposing sides of the receiving part, wherein the pair of flanges have lengths in the axial direction that are the same; and
the second member has opposed ends that are attachable to the flanges of the first member so as to be configured to retain the cable within the receiving part of the first member.

20. A cable clamp for an electrical cable, comprising:
a first member and a second member configured to cooperatively retain a cable between them; wherein
the first member has been formed by extrusion in the general axial direction of a cable as it is to be retained in the clamp, at least a portion of the axial cross-section of the first member comprising a receiving part having a curved shape forming a concave top side configured to receive a portion of the cable and a convex bottom side opposite the top side, a pair of elongated flanges extending from opposing left and right sides of the receiving part, and an elongated rib extending from the bottom side of the receiving part in a direction perpendicular to the flanges, wherein the pair of flanges and the rib are elongated in the axial direction and extend along the left, right, and bottom sides of the receiving part in the axial direction; and
the second member has opposed ends that are attachable to the flanges of the first member so as to be configured to retain the cable within the receiving part of the first member.

* * * * *